US011080375B2

(12) United States Patent
Fuentes et al.

(10) Patent No.: US 11,080,375 B2
(45) Date of Patent: Aug. 3, 2021

(54) POLICY BASED ADAPTIVE IDENTITY PROOFING

(71) Applicant: INTUIT INC., Mountain View, CA (US)

(72) Inventors: Antonio Fuentes, Carlsbad, CA (US); Douglas L. Foiles, San Diego, CA (US); Jeremy Luchau, San Diego, CA (US); Ergang Sun, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 188 days.

(21) Appl. No.: 16/052,287

(22) Filed: Aug. 1, 2018

(65) Prior Publication Data

US 2020/0042679 A1 Feb. 6, 2020

(51) Int. Cl.
*G06F 21/31* (2013.01)
*G06F 21/33* (2013.01)
*H04L 29/08* (2006.01)
*H04W 8/18* (2009.01)
*H04L 29/06* (2006.01)

(52) U.S. Cl.
CPC .......... *G06F 21/316* (2013.01); *G06F 21/335* (2013.01); *H04L 63/102* (2013.01); *H04L 67/306* (2013.01); *H04W 8/18* (2013.01); *H04L 63/20* (2013.01)

(58) Field of Classification Search
CPC ..... G06F 21/316; G06F 21/335; H04L 67/306
See application file for complete search history.

(56) References Cited

U.S. PATENT DOCUMENTS

| 8,239,677 B2 | 8/2012 | Colson |
| 8,572,391 B2 | 10/2013 | Golan et al. |
| 8,584,219 B1 * | 11/2013 | Toole ............... G06F 21/60 726/25 |
| 8,789,194 B2 | 7/2014 | Toole et al. |
| (Continued) | | |

FOREIGN PATENT DOCUMENTS

WO 2014142947 A1 9/2014

OTHER PUBLICATIONS

International Search Report and Written Opinion for Application No. PCT/US2019/041943 dated Oct. 30, 2019.

*Primary Examiner* — Farid Homayounmehr
*Assistant Examiner* — Suman Debnath
(74) *Attorney, Agent, or Firm* — Patterson + Sheridan, LLP

(57) ABSTRACT

Certain aspects of the present disclosure provide techniques for determining an identity of a user requesting access to a resource. An example technique for determining the identity of the user includes, upon receiving a request for a resource, determining the identity assurance strength of the user. The determination of the identity assurance strength of the user is based on personal identifying information, risk signals, user history, and the like. If the user does not have the requisite identity assurance strength to access a resource, based on policy criteria, an identity proofing operation may be determined for the user to complete in order to access the resource, where the operation is determined based on policy criteria, risk signals, and the like. Upon completion of the identity assurance operation, if the user has adequate identity assurance strength, then the user may access the resource.

20 Claims, 9 Drawing Sheets

(56) References Cited

U.S. PATENT DOCUMENTS

| | | |
|---|---|---|
| 2007/0282610 A1 | 12/2007 | Luss et al. |
| 2008/0127296 A1 | 5/2008 | Carroll et al. |
| 2012/0054827 A1 | 3/2012 | Horn et al. |
| 2012/0072606 A1 | 3/2012 | Shevchenko et al. |
| 2012/0159590 A1 | 6/2012 | Novack et al. |
| 2013/0191898 A1 | 7/2013 | Kraft |
| 2014/0208419 A1 | 7/2014 | Chang et al. |
| 2014/0289116 A1 | 9/2014 | Polivanyi |
| 2015/0324559 A1 | 11/2015 | Boss et al. |
| 2016/0063239 A1* | 3/2016 | Chen ............... G06F 21/45 726/6 |
| 2016/0125199 A1* | 5/2016 | Lee ............... G06F 21/316 726/28 |
| 2016/0212101 A1 | 7/2016 | Reshadi et al. |
| 2017/0093920 A1 | 3/2017 | Ducatel et al. |
| 2018/0288063 A1* | 10/2018 | Koottayi ............ G06F 21/50 |

* cited by examiner

POLICY BASED ADAPTIVE IDENTITY PROOFING

INTRODUCTION

Aspects of the present disclosure generally relate to a method and system of determining the identity of a user requesting access to a resource. In particular, embodiments of the present disclosure involve an adaptive approach, based on a policy, to determine the identity assurance strength of the user requesting access to the resource and, in some cases, an identity proofing operation specific for the user to complete.

BACKGROUND

There is a steady growth in the amount of types and forms of computer-based resources. For example, an employer may store W2 forms of employees in a computer database management system dedicated solely to the employer. In another example, a bank may store a history of transactions associated with a user account across one or more servers. In yet another example, a user may file tax return documents online with the Internal Revenue Service or access tax return documents with a tax preparation application. With the growth of computer-based resources, there is a corresponding increase in the need for allowing access to resources to only those who are authorized, as well as protecting the associated sensitive data and personal information.

For example, computer-based resources may include sensitive data and personal information associated with a user. The sensitive data and personal information may include, but is not limited to, a user's account number, credit card number, debit card number, other banking information, social security number, home address, home phone number, personal cell phone number, employer address, work phone number, driver's license, passport, health information, and other personal identifiable information (PII).

If a bad actor were to steal the identity of the user, then the bad actor may have access to sensitive data and personal information stored in or accessible by computer-based resources, which would otherwise be accessible only to those with the requisite authority. In stealing the identity of the user, the bad actor may have stolen information such as the name of the user, date of birth, address, telephone number, and credit card number. By using the stolen information, the bad actor may access one or more of the user's accounts fraudulently by impersonating the user and may thereafter access additional sensitive data and other personal information. Additionally, the bad actor may undertake unauthorized actions including, for example: performing financial transactions, signing documents, entering into agreements, etc.

Conventional solutions include identity-management systems that confirm the identity of a user prior to allowing the user access to a computer-based resource based on user produced information. However, conventional solutions are not adequate in light of the increasing frequency and sophistication of data breaches and identity thefts. For example, with just a few stolen pieces of information, such as name, address, Social Security number, and credit card number, a bad actor may be able to impersonate a user and request access to a computer-based resource that they would otherwise have been prevented from accessing without the stolen information.

Therefore, a solution is needed for a more reliable and adaptive determination of the identity of the user, which also adheres to policy criteria associated with the computer-based resource.

BRIEF SUMMARY

Certain embodiments provide a method for identity proofing. The method generally includes receiving a request from a user for a resource. The method further includes determining an identity assurance strength of the user, wherein the determination of the identity assurance strength of the user is based on at least retrieving personal identifying information from the user, reviewing global identity reputation data and risk signal data associated with the user, determining a history of identity proofing events associated with the user, determining the retrieved personal identifying information matches personal identifying information associated with each identity proofing event in the history of identity proofing events, determining user preference associated with the history of identity proofing events, and determining a timeframe for each of the identity proofing events in the history of identity proofing events. The method further includes determining the user does not have an adequate identity assurance strength to access the resource. The method further includes determining an identity proofing operation for the user to complete, wherein the determination of the identity proofing operation is adapted to the user based on at least an identity proofing method needed to satisfy the identity assurance strength, a capability of a computing device associated with the user, a global identity reputation associated with the user, and a risk signal associated with the user. The method further includes determining, based on the determined identity proofing operation, that the user has the adequate identity assurance strength to access the resource. The method further includes enabling access to the resource.

Other embodiments may provide a non-transitory computer-readable storage medium comprising instructions that, when executed by one or more processors, cause the one or more processors to perform a method for identity proofing. The method generally includes receiving a request from a user for a resource. The method further includes determining an identity assurance strength of the user, wherein the determination of the identity assurance strength of the user is based on at least retrieving personal identifying information from the user, reviewing global identity reputation data and risk signal data associated with the user, determining a history of identity proofing events associated with the user, determining the retrieved personal identifying information matches personal identifying information associated with each identity proofing event in the history of identity proofing events, determining user preference associated with the history of identity proofing events, and determining a timeframe for each of the identity proofing events in the history of identity proofing events. The method further includes determining the user does not have an adequate identity assurance strength to access the resource. The method further includes determining an identity proofing operation for the user to complete, wherein the determination of the identity proofing operation is adapted to the user based on at least an identity proofing method needed to satisfy the identity assurance strength, a capability of a computing device associated with the user, a global identity reputation associated with the user, and a risk signal associated with the user. The method further includes determining, based on the determined identity proofing operation, that the user has the adequate identity assurance strength to access the resource. The method further includes enabling access to the resource.

Other embodiments provide a system comprising a processor and a memory storing instructions which when executed by the processor perform a method for identity proofing. The method generally includes receiving a request from a user for a resource. The method further includes determining an identity assurance strength of the user, wherein the determination of the identity assurance strength of the user is based on at least retrieving personal identifying information from the user, reviewing global identity reputation data and risk signal data associated with the user, determining a history of identity proofing events associated with the user, determining the retrieved personal identifying information matches personal identifying information associated with each identity proofing event in the history of identity proofing events, determining user preference associated with the history of identity proofing events, and determining a timeframe for each of the identity proofing events in the history of identity proofing events. The method further includes determining the user does not have an adequate identity assurance strength to access the resource. The method further includes determining an identity proofing operation for the user to complete, wherein the determination of the identity proofing operation is adapted to the user based on at least an identity proofing method needed to satisfy the identity assurance strength, a capability of a computing device associated with the user, a global identity reputation associated with the user, and a risk signal associated with the user. The method further includes determining, based on the determined identity proofing operation, that the user has the adequate identity assurance strength to access the resource. The method further includes enabling access to the resource.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
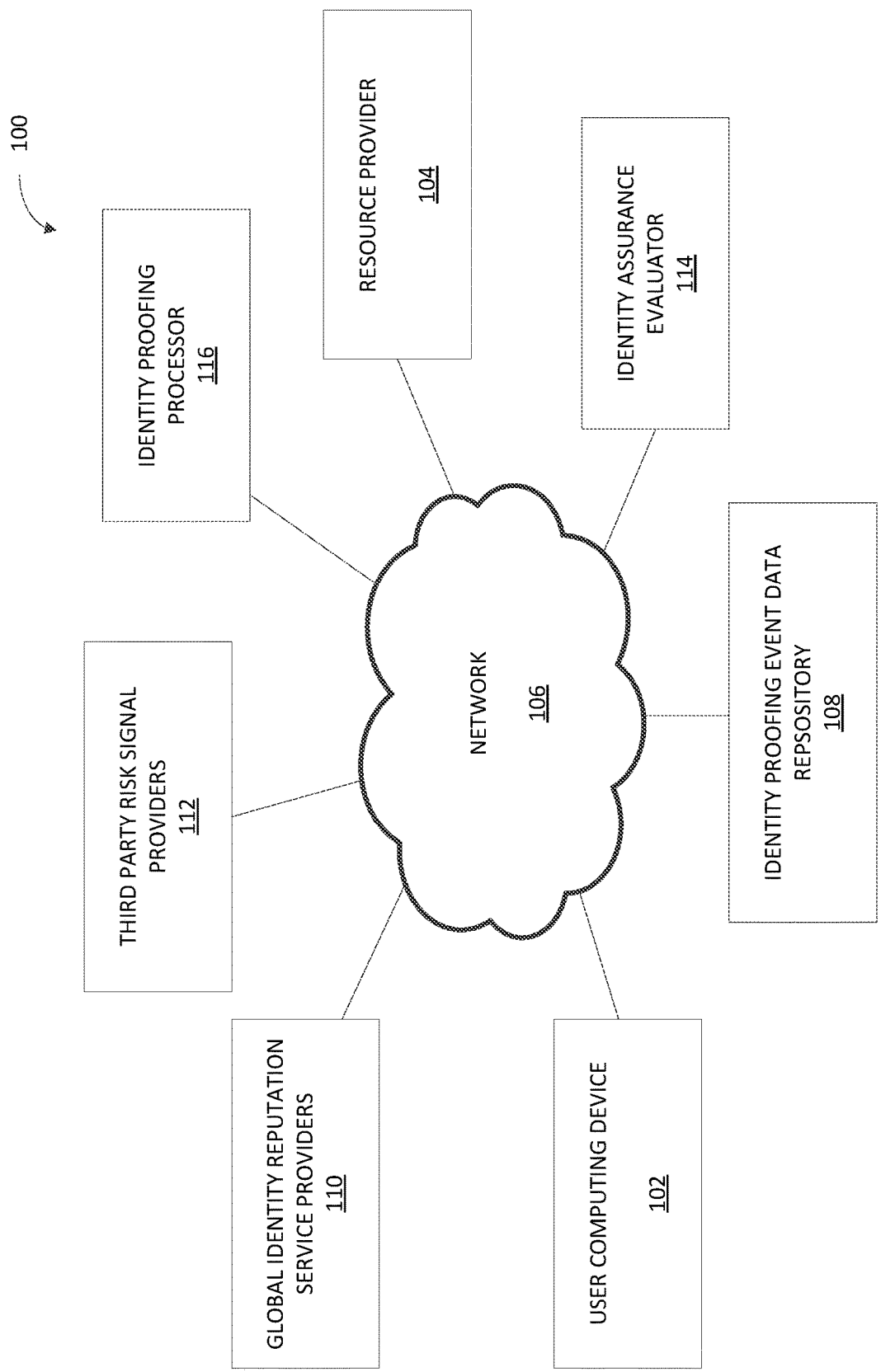
FIG. 1 depicts an example computing environment for adaptively determining the identity assurance strength of a user requesting access to a resource.

Aspects of the present disclosure provide apparatuses, methods, processing systems, and computer readable mediums for adaptively determining, based on a policy, an identity of a user requesting access to a computer-based resource.

To prevent unauthorized access of sensitive data and personal information, in some cases it is necessary to confirm the identity of the user requesting access to and performing actions associated with a computer-based resource. It also necessary to determine that the user has the authority to access the computer-based resource and act accordingly. At the same time, the determination of the identity and authority of a user to access the computer-based resource must adhere to the policy associated with the computer-based resource.

In order to determine the identity of a user requesting access to a computer-based resource, it is necessary for a resource provider to determine an identity assurance strength of the user. The identity assurance strength indicates a level of confidence associated with the identity of a user requesting access by determining the user is who they are claiming to be with the request to access a resource. The identity assurance strength is based on reviewing user data, which comes from multiple sources including the user, the resource provider, and third party data providers. Additionally, the determination of the identity assurance strength of the user is adaptive based on the specific policy associated with the requested resource and user data.

The identity assurance strength of the user is determined based on leveraging an identity assurance evaluator and, in some cases, an identity proofing processor. In some implementations, the identity assurance evaluator and the identity proofing processor can be two separate components. In other implementations, the identity assurance evaluator and the identity proofing processor can be one component. In still other implementations, the identity assurance evaluator and the identity proofing processor can be internal to a resource provider or located remotely from the resource provider. The identity assurance evaluator and the identity proofing processor are each comprised of static rules and dynamic rules. The static rules can be pre-defined by a resource provider, third party resource providers, regulatory entities, etc. The dynamic rules can be trained and built by machine learning models.

The resource provider receives a request from the user for a computer-based resource. The identity assurance evaluator reviews a request from the user for a computer-based resource against specific access policy criteria associated with requested computer-based resource. Access policy criteria include historical identity proofing events, timeframe, global identity reputation, and risk signals. The request is also evaluated based on dynamic rules.

The identity assurance evaluator retrieves user data specific to the user requesting access to the resource. The user data includes personal identifying information, preferences, global identity reputation data, identity proofing event data, risk signals data, and other data now known and later determined associated with the user capable of contributing to the determination of an identity assurance strength. With the user data, the identity assurance evaluator evaluates each static rule based on access policy criteria and dynamic rule associated with the requested resource to determine the identity assurance strength of the user.

The identity assurance strength of the user is then compared to the required identity assurance strength for the requested resource. If the identity assurance strength of the user meets the identity assurance strength requirement of the resource, then access is granted to the user for the requested resource.

If the identity assurance strength of the user fails to meet the identity assurance strength requirement of the resource, an identity proofing processor can determine an identity proofing operation for the user to complete. The identity proofing processor determines the identity proofing operation for the user based on the access policy criteria (i.e., static rules), dynamic rules, user data, availability of identity proofing methods, and user experience friction.

The identity proofing processor can provide the identity proofing operation to the user to complete. The identity proofing operation can comprise one or more identity proofing methods for the user to complete. Upon completing the identity proofing operation, the identity assurance evaluator can determine a new identity assurance strength of the user. If the user has sufficient identity assurance strength after completing the identity proofing operation, then access to the requested resource is granted. If the user does not have sufficient identity assurance strength, then the user is blocked from accessing the resource. The ability to determine and provide an identity proofing operation to the user improves on conventional methods where a user would simply be denied access to the resource. In this way, access to computer-based resources may be tightly controlled, but with the flexibility to allow a user to dynamically increase its associated identity assurance strength.

Example Computing Environment for Adaptively Determining a User Identity Assurance Strength FIG. 1 depicts an example computing environment 100 for adaptively determining an identity assurance strength of a user requesting access to a computer-based resource. The user may request via user computing device 102 access to a computer-based resource from resource provider 104. User computing device 102 can include, for example, a tablet, a smartphone, a laptop computer, a desktop computer, a wearable device, or other computing devices now known or later developed. Resource provider 104 can include a bank, an employer, a credit card company, a credit reporting company, an insurance company, a financial management company, a tax service provider, and other resource providers now known and later developed capable of providing computer-based resources. Computer-based resources can include employment records, W2, tax return forms, financial transaction history, financial accounts, medical history, and other computer-based resources now known and later developed.

Resource provider 104 can receive the request from user computing device 102 via network 106. Network 106 can include, for example, local area networks (LANs), wireless LANs (WLANs), wide area networks (WANs), wireless WANs (WWANs), and other technology now known or later developed capable of transmitting data between computing devices.

Upon receiving the request from user computing device 102, resource provider 104 can determine an identity assurance strength of the user requesting access to the computer-based resource. Resource provider 104 can determine the identity assurance strength of the user by an identity assurance evaluator, such as described below with respect to FIG. 2, that evaluates access policy criteria specific to the requested resource and user data associated with the user requesting access to the resource. In particular, the access policy criteria evaluated by the identity assurance evaluator includes a history of identity proofing events, timeframes, global identity reputation, and risk signals.

The identity assurance evaluator determines the identity assurance strength based on static rules and dynamic rules. The static rules include rules established according to the policy criteria associated with the requested computer-based resource. For example, a static rule can be defined by risk signal criteria in an access policy as five failed events in the user's history of identity proofing events (i.e., failed attempts at completing an identity proofing method, account login, identity proofing operation, etc.) is indicative of a risk signal. Based on the static rule, if the identity assurance evaluator determines from user data that there were five unsuccessful attempts by the user, then the resource provider can take action based on the static rule associated with the policy, which can include blocking the user from further attempting to access the account, eliminating some or all of a user's history of identity proofing events, etc.

The dynamic rules are built based on machine learning models. The machine learning models are trained by reviewing data from the user, other users, third parties, requests for access to resources from the user, requests for access to resources from the other users, and other data now known and later determined for training machine learning models to build dynamic rules for determining the identity assurance strength of a user. Continuing the example, a machine learning model can adapt to build a rule specific to the user requesting access that determines three failed events in the user's history of identity proofing events as indicative of a risk signal. The dynamic rule determined by the machine learning model can be based on reviewing data and determining that three or more failed attempts were associated with a fraudulent user.

To determine the identity assurance strength of the user, the identity assurance evaluator 114 evaluates each access policy criteria with user data. In some implementations, the identity assurance evaluator 114 can be internal to a resource provider 104. In other implementations, the identity assurance evaluator 114 can be remotely located from the resource provider 104. The user data includes data directly collected from the user, data determined by resource provider 104 associated with the user, data from third parties associated with the user, and other user data now know and later determined capable of determining the identity assurance strength.

Data directly collected from the user includes personal identifying information and user preferences. For example, after receiving the request for a resource from user, resource provider 104 can request and collect, via the user computing device 102, personal identifying information from the user, based on the specific access policy associated with the resource.

Data determined by resource provider 104 includes risk signals and history of identity proofing events. The risk signals can be determined by resource provider based on the history of identity proofing events associated with the user. The history of identity proofing events can be stored in an identity proofing event data repository 108 associated with resource provider 104 and retrieved for determining the identity assurance strength of the user by the identity assurance evaluator. In some implementations, the identity proofing event data repository 108 can be located remotely from the resource provider 104. In other implementations, the identity proofing event data repository 108 can be located at resource provider 104.

Data from third parties include global identity reputation data and risk signals. The global identity reputation data is retrieved from global identity reputation service providers 110. Global identity reputation service providers 110 monitor user activity across different accounts and can include, for example, credit reporting companies, banks, or security companies. For example, global identity reputation service providers 110 can include THREAT METRIX®, LEXIS NEXIS®, and EQUIFAX®. Global identity reputation service providers 110 can also monitor and detect suspicious activity associated with a user across industries, the darknet, etc. Risk signals can also be retrieved by resource provider 104 from third party risk signal providers 112 indicative of suspicious activity associated with a user's account.

Based on the user data, the identity assurance evaluator 114 determines the identity assurance strength of the user. If the identity assurance strength of the user meets the identity assurance strength of the computer-based resource, as required by the associated access policy, then the user can access the computer-based resource. Additionally, resource provider 104 can make a record of the access and can store the record in the identity proofing event data repository 108. If the identity assurance strength of the user does not meet the identity assurance strength for the computer-based resource as required by the access policy, then the identity proofing processor 116 determines an adaptive identity proofing operation, based on the access policy, for the user to complete to increase the identity assurance strength. In some implementations, the identity proofing processor 116 can be internal to the resource provider 104. In other implementations, the identity proofing processor 116 can be remotely located from the resource provider 104. In still other implementations, the identity proofing processor 116 and the identity assurance evaluator 114 can a single component or can comprises multiple components. Additionally, a record can be made of the user not having adequate identity assurance strength by resource provider 104 and stored in the identity proofing event data repository 108.

The identity proofing operation can comprise one or more identity proofing methods. An identity proofing method can include phone verification, out of wallet knowledge based authentication (OOW KBA), government identification verification, verification of financial account transactions, and other identity proofing methods now known or later developed capable of determining user identity. For example, the government identification verification identity proofing method can require scanning a notarized copy of a user's passport. The one or more identity proofing methods that comprise the identity proofing operation are based on an access policy associated with the computer-based resource and adapted specifically for the user by the identity proofing processor 116 leveraging the static rules, dynamic rules, and identity proofing operation considerations with user data. In some implementations, the identity proofing processor 116 can leverage the same static rules and dynamic rules as the identity assurance evaluator 114. In other implementations, the identity proofing processor 116 can leverage static rules and dynamic rules different from the static rules and dynamic rules leveraged by the identity assurance evaluator 114. For example, the identity proofing processor 116 can leverage static rules defined by identity proofing considerations. Additionally, the identity proofing processor 116 can leverage dynamic rules built based on identity proofing considerations. Identity proofing operation considerations include the capabilities of user computing device 102, availability of an identity proofing method, user experience friction, the current identity assurance strength, or other considerations now known and later developed for determining identity proofing operations.

Once the identity proofing operation has been determined, resource provider 104 provides the identity proofing operation to user computing device 102 for the user to complete. Upon successful completion of the identity proofing operation, the identity assurance evaluator 114 determines a new identity assurance strength of the user. If the identity assurance strength of the user meets the identity assurance strength required by the resource, the user via the user computing device 102 is granted access to the computer-based resource from resource provider 104. Additionally, the successful completion of the identity proofing operation by the user may be recorded in the history of identity proofing events of the user and stored in the identity proofing event data repository 108. If the user does not successfully complete the identity proofing operation, then the user can be blocked from accessing the requested computer-based resource, and the failed attempt at completing the identity proofing operation can be recorded as a failed identity proofing event in the history of identity proofing events of the user and stored in the identity proofing event data repository 108.

Example of Adaptively Determining the Identity Assurance Strength of a User

Figure 2:
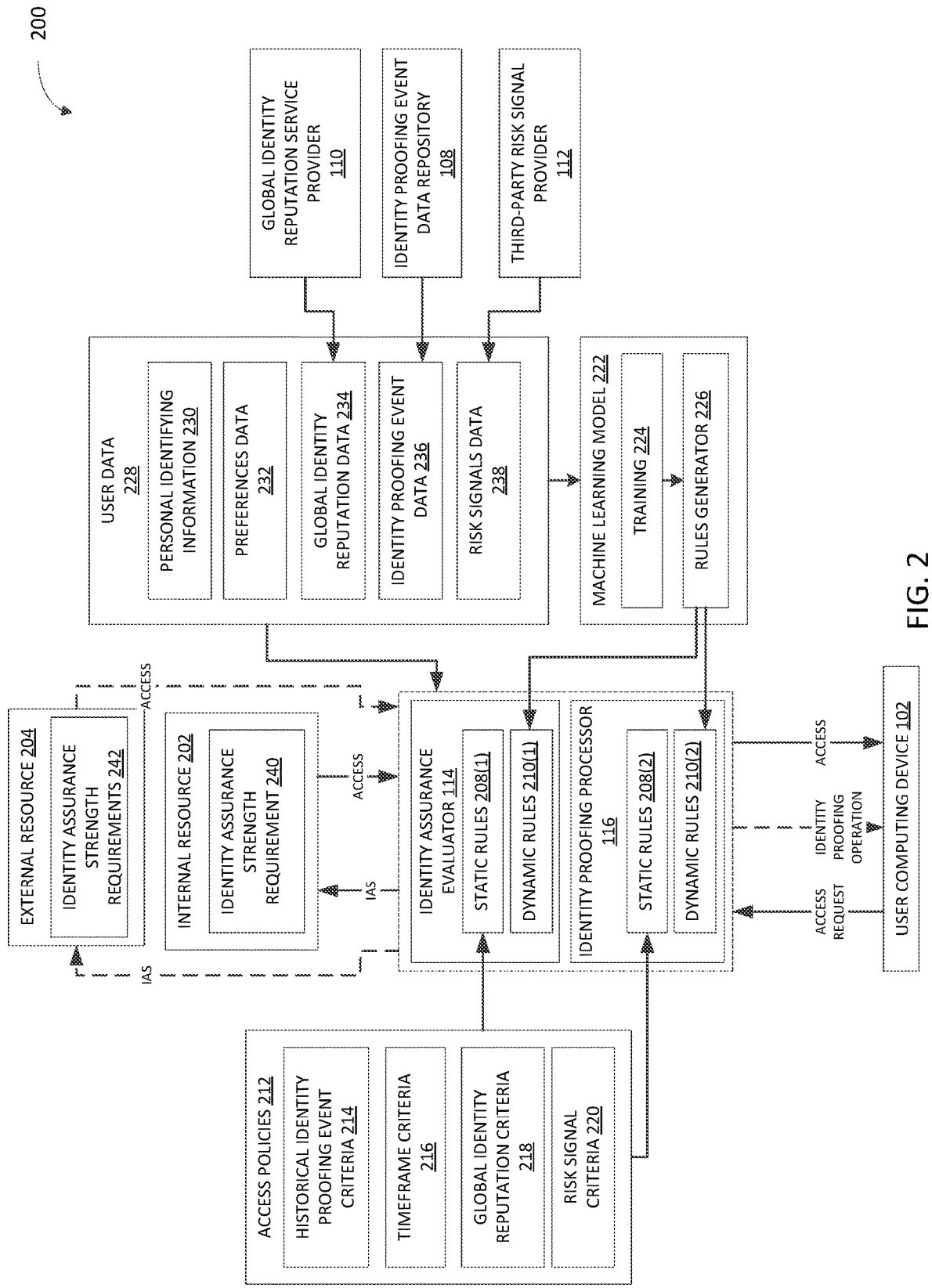
FIG. 2 depicts an example of adaptively determining the identity assurance strength of a user requesting access to a resource.

FIG. 2 depicts an example system 200 of adaptively determining the identity assurance strength of a user requesting access to a resource.

In some implementations, the computer-based resource can be an internal resource 202 of a resource provider (such as resource provider 104 described with respect to FIG. 1). For example, the resource provider may be a bank, and the user may be requesting access from their online bank account to a bank resource such as account monthly statements or online check book. In other implementations, the computer-based resource can be an external resource 204 from a third party resource provider. Continuing the example, the resource provider can be a bank, and the user is requesting from their bank account a credit reporting history from a third party credit reporting company.

Upon receiving the request from the user for access to a computer-based resource, the identity assurance strength of the user is determined by an identity assurance evaluator 114. Identity assurance evaluator 114 comprises static rules 208(1) and dynamic rules 210(1).

Static rules 208 are based on an access policy 212 associated with the computer-based resource. In some implementations, the access policy criteria can be defined by the resource provider. In other implementations, the access policy criteria can be defined by a third party resource provider, a regulatory entity, global identity reputation service providers 110, or third party risk signal providers 112.

In still other implementation, the static rules 208 can be based on more than one access policy 212. For example, the static rules 208 for a credit history report can be defined by access policies 212 from the bank, the credit history reporting company, and global identity reputation service providers 110.

Access policy 212 includes resource specific access criteria that may form the basis of static rules 208. Access policy criteria include a historical identity proofing event criteria 214, a timeframe criteria 216, a global identity reputation criteria 218, a risk signal criteria 220, and other access criteria (not depicted) now known and later developed for determining identity assurance strength.

Each access policy criteria may relate to one or more static rules 208. For example, historical identity proofing event criteria 214 may form the basis of static rules 208 such as a user must have a certain number of identity proofing events. The identity proofing events are indicative of a successfully completed or failed attempt of an identity proofing method, identity proofing operating, login attempt, etc. For example, historical identity proofing event criteria 214 can require the user have ten identity proofing events completed. Historical identity proofing event criteria 214 can also define static rules 208 such as the user requesting access must have completed certain types of identity proofing events. For example, historical identity proofing event criteria 214 can require that all identity proofing events of a user be successfully completed identity proofing methods. As another example, historical identity proofing event criteria 214 can require that 90% of the identity proofing events of a user be successfully completed identity proofing methods.

Timeframe criteria 216 may form the basis of static rules 208 that are associated with the length of time historical identity proofing events associated with a user are valid for consideration in determining the identity assurance strength. For example, a phone verification identity proofing method can be associated with a short timeframe such as ten minutes. Thus, if ten minutes has passed since the successful completion of the identity proofing method, then the identity proofing event indicating successful completion of an identity proofing method can be used in the determination of the identity assurance strength, but the identity proofing method itself cannot be used since more than ten minutes has passed. In some embodiments, the timeframe can be established by a resource provider as part of the access policy criteria. In other embodiments, the timeframe criteria can be inherent to the identity proofing method. For example, the timeframe criteria associated with verification of government ID can align with the validity of the government ID. Once the government ID expires (i.e., driver's license, passport, etc.), then the identity proofing event can no longer be valid for consideration in the identity assurance strength of the user.

Global identity reputation criteria 218 may form the basis of static rules 208 that are associated with global identity reputation of the user. Global identity reputation of the user may be based on reports from multiple global identity reputation service providers indicative of whether the user's identity is authentic, compromised, stolen, or associated with a bad actor, such as a hacker or imposter. Global identity reputation criteria 218 can define a static rule 208 that the user is required to not have a compromised global identity reputation. Global identity reputation criteria 218 can also define static rules 208 for determining course of action if the global identity reputation of the user indicates a stolen identity or associated with a bad actor, such requiring the resource provider to block the request of the user, the user to complete a specific identity proofing method, etc.

Risk signals criteria 220 associated with access policy 212 may form the basis of static rules 208 that are associated with risk signals of the user. Risk signals are indicative of suspicious activity associated with the account of the user and can be determined by the resource provider or from third party risk signal providers 112. For example, multiple, failed attempts by a user to log in or complete an identity proofing method can result in a risk signal being generated. The generated risk signal can be associated with the account of the user. Risk signals criteria 220 may form the basis of static rules 208 such as if a user has a certain number of risk signals associated with their account, then the resource provider can be required to take specific action. For example, risk signal criteria 220 can define a static rule 208 in which if a presence of a risk signal is determined, then all of the history of identity proofing events of the user are eliminated from the identity proofing event data repository 108. In another example, the static rule 208 can be defined in which if a risk single is determined, then 50% of the history of identity proofing events of the user is eliminated from the identity proofing event data repository 108. In still another example, the static rule 208 can be defined in which if a risk signal is determined, then access to the resource is blocked by the resource provider, the user is required to complete a specific identity proofing method, etc.

Dynamic rules 210 are also included in the identity assurance evaluator 114 and are built by one or more machine learning models 222. A machine learning model 222 may be trained 224 by reviewing data to determine patterns of behavior and dynamically building rules with a rule generator 226 to adaptively determine the identity of the user. Machine learning model 222 can review user data 228 including personal identifying information 230, preferences data 232, global identity reputation data 234, identity proofing event data 236, risk signal data 238, and other data now known and later determined for building dynamic rules. By reviewing user data 228, machine learning model 222 can determine patterns of behavior associated specifically to the user and build rules with rule generator 226. For example, based on reviewing the user data 228, machine learning model 222 can determine from identity proofing event data 236 consistent identity proofing events indicative of successful completion of identity proofing methods. The machine learning model 222 can then build a rule, for example, that three instances of failed attempts at identity proofing method is a risk signal specific to that user.

Machine learning model 222 can also generate rules based on data from third parties. For example, machine learning model 222 can generate rules based on patterns of behaviors of other users associated with the resource provider by reviewing and training 224 with data from identity proofing event data repository 108.

With one or more access policies 212 forming the basis of static rules 208(1) specific to the resource and dynamic rules 210(1), identity assurance evaluator 114 can be adapted to determine the identity assurance strength of the user requesting access. Identity assurance evaluator 114 leverages user data 228 to determine the identity assurance strength of the user. For example, identity assurance evaluator 114 can review personal identifying information 230, preferences data 232, global identity reputation data 234, identity proofing event data 236, risk signal data 238, and other data against the static rules 208(1) and dynamic rules 210(2) to determine the identity assurance strength of the user.

Personal identifying information 230 refers to information such as name, date of birth, employer, home phone number, cell phone number, employer number, home address, employer address, Social Security Number, credit card number, bank account number, biometric information, and other types of information indicative of a user's identity. Resource provider can retrieve personal identifying information 230 from the user. Identity assurance evaluator 114 can determine if personal identifying information 230 provided upon request to the user by resource provider, whether it matches the personal identifying information associated with previous identity proofing events of the user.

Preferences data 232 refers to user preferences established by the user with resource provider. A user can limit use of certain identity proofing events by identity assurance evaluator 114 in determining the identity assurance strength. For example, a user can limit an identity assurance evaluator 114 from using an identity proofing event such as a government ID verification successfully completed to instances when only agreed to by user.

Global identity reputation data 234 refers to data provided by global identity reputation service providers 110 indicative of the global reputation of the user. Global identity reputation data 234 can be associated with a user's account, email address, telephone number, personal identifying information, or a user device. For example, global identity reputation data 234 can indicate that an email associated with a user is associated with fraudulent activity. In another example, global identity reputation data 234 can indicate that a Social Security Number associated with a user attempting to access a resource has been identified as stolen.

Identity proofing event data 236 refers to data associated with the user, indicating successful attempts or failed attempts of one or more identity proofing methods. Identity proofing event data 236 is retrieved from identity proofing event data repository 108. Risk signal data 238 refers to risk signals associated with the account of the user requesting access. In some implementations, risk signals are associated with an email address, a telephone number, personal identifying information, or a user device associated with the user. Risk signal data 238 can be generated by resource provider or received from third party risk signal providers 112.

Identity assurance evaluator 114 uses user data 228 to determine the identity assurance strength associated with the user. For example, upon receiving a request from a user for a computer-based resource, the resource provider 104 can prompt and retrieve from the user personal identifying information based on the access policy associated with the resource. The identity assurance evaluator 114 can then review the user data and apply the static rules and dynamic rules to determine which identity proofing events and their associated strengths are valid for determining the identity assurance strength of the user. The identity assurance evaluator 114 can determine if the retrieved personal identifying information matches the personal identifying information associated with identity proofing events previously completed by the user. The identity assurance evaluator 114 can review global identity reputation data 234 and risk signal data 238 to determine if there are any indications of user acting suspiciously or may be compromised. If the global identity reputation data 234 or risk signal data 238 indicate this, then the identity assurance evaluator 114 can indicate which course of action the resource provider should take, including eliminating some or all of the identity proofing events associated with the user, blocking further access to the resource, etc. The identity proofing events that are eliminated can be eliminated from the identity proofing event data repository 108 or can be eliminated from consideration in the determination of the identity assurance strength of the user. The identity assurance evaluator 114 also determines from the identity proofing event data 236, which identity proofing events of the user are valid for determining the identity assurance strength. If according to the rules established by the timeframe criteria 216 that too much time has elapsed with regard to certain identity proofing events, then those identity proofing events will be eliminated from consideration. Once all of the valid identity proofing events of the user are determined, the identity assurance strength of the user can be determined based on the strengths associated with the valid identity proofing events.

The identity assurance strength of the user is compared to the identity assurance requirement of the computer-based resource. In some implementations, if user is requesting access to an internal resource 202, then a determination is made if the identity assurance strength of the user is sufficient to meet the identity assurance strength requirement 240 of the internal resource 202. In other implementations, if user is requesting access to an external resource 204, then a determination is made if the identity assurance strength of the user is sufficient to meet the identity assurance strength requirement 242 of the external resource 204.

If the user has sufficient identity assurance strength, then the resource provider can grant access to the resource to the user. If the user does not have sufficient identity assurance strength, then identity proofing processor 244 can determine an identity proofing operation for the user to complete.

Identity proofing processor 244 can determine an identity proofing operation by leveraging the static rules 208(2), dynamic rules 210(2), and identity proofing operation considerations (not depicted) with user data 228. For example, identity proofing processor 116 can determine based on access policy criteria and user data 228 what identity proofing methods the user can complete to gain access to the requested resource. In one implementation, identity proofing processor 116 can determine, based on access policy 212, a user requesting access to a computer-based resource is required to complete either a phone verification or a OOW KBA identity proofing method prior to granting access to the resource. The identity proofing processor 116 can determine the user requesting access does not have an associated cell phone to complete the phone verification identity proofing method. The identity proofing operation can then be adapted according to the access policy to require that the user complete the OOW KBA instead. For example, the user will need to answer to specific questions that only the user would have knowledge of based on the user's past history and activities.

If the user does have an associated cell phone to complete the phone verification, then the identity proofing operation can be adapted to require that the user complete the phone verification based on additional considerations such as: ease of use (i.e., user experience friction) for the user to complete the phone verification in comparison to the OOW KBA identity proofing method, availability of phone service, and user preference for phone verification.

Alternatively, if the user does have an associated phone to complete the phone verification, but cellular service is not available to the user or the user preference indicates a preference for completing OOW KBA over phone verification, then the identity proofing operation can be adapted to require that the user complete the OOW KBA.

In addition, the identity proofing operation can be determined based on the capability of the user computing device 102 associated with the user requesting access to a resource. If the policy associated with a resource requires completion of either phone verification or government identification verification and the phone associated with the user does not have SMS capability, then the identity proofing method for the identity proofing operation is adapted to require the user to complete government identification verification.

The identity proofing operation is provided to the user to complete. Upon completing the identity proofing operation, the identity assurance evaluator 114 determines a new identity assurance strength based on the response from the user completing the identity proofing operation. If the new determined identity assurance strength is sufficient to meet the requirement of the resource, then the user is granted access. If the user does not have sufficient identity assurance strength upon completing the identity proofing operation, the resource provider can block the user from further access, record the failed attempt in the identity proofing event data repository, and other similar actions preventing the user from accessing the resource.

Figure 3A:
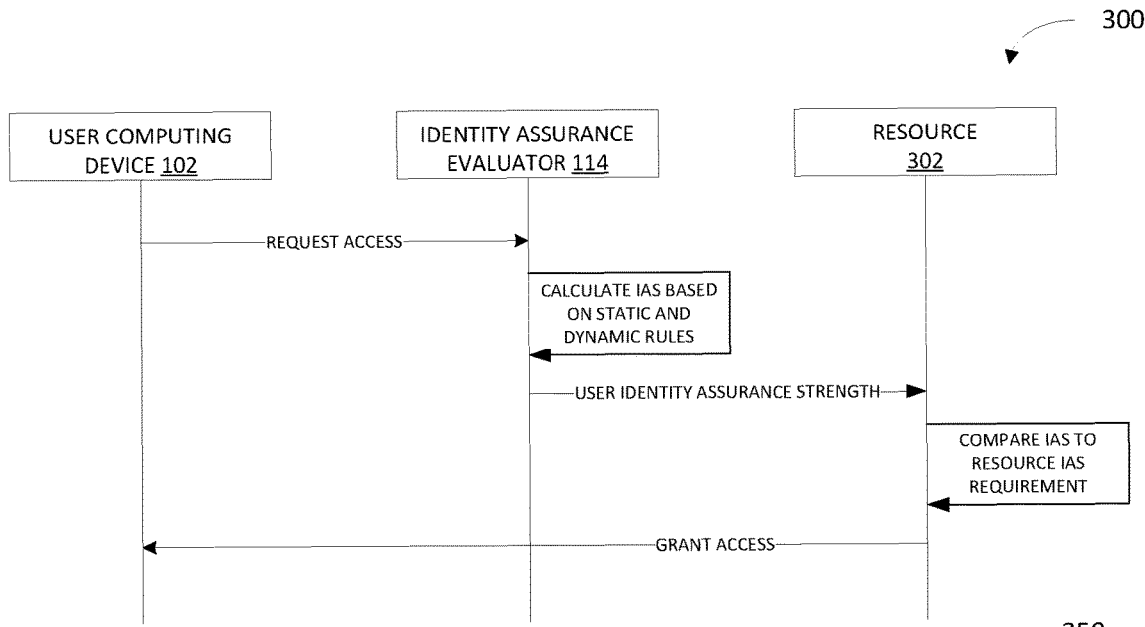
FIG. 3A depicts an example flow diagram of an implementation of granting access to a resource based on adaptively determining the identity assurance strength of the user requesting access to a resource.

Example Flow Diagram for Adaptively Determining the Identity Assurance Strength of a User FIG. 3A depicts an example flow diagram 300 of an implementation of granting access to a resource based on adaptively determining the identity assurance strength of the user.

In the flow diagram 300, a user via a user computing device 102 requests access to a resource 302 (i.e., internal resource 202 or external resource 204 as described in FIG. 2) from a resource provider. The resource provider can receive the request, and the identity assurance evaluator 114 (either internal or remote to the resource provider) can evaluate the request and calculate the identity assurance strength (IAS) of the user based on static and dynamic rules. The identity assurance strength of the user is compared to the identity assurance strength of the resource 302. If the identity assurance strength of the user is sufficient in meeting the resource requirement of the identity assurance strength, then the user is granted access to the resource.

Figure 3B:
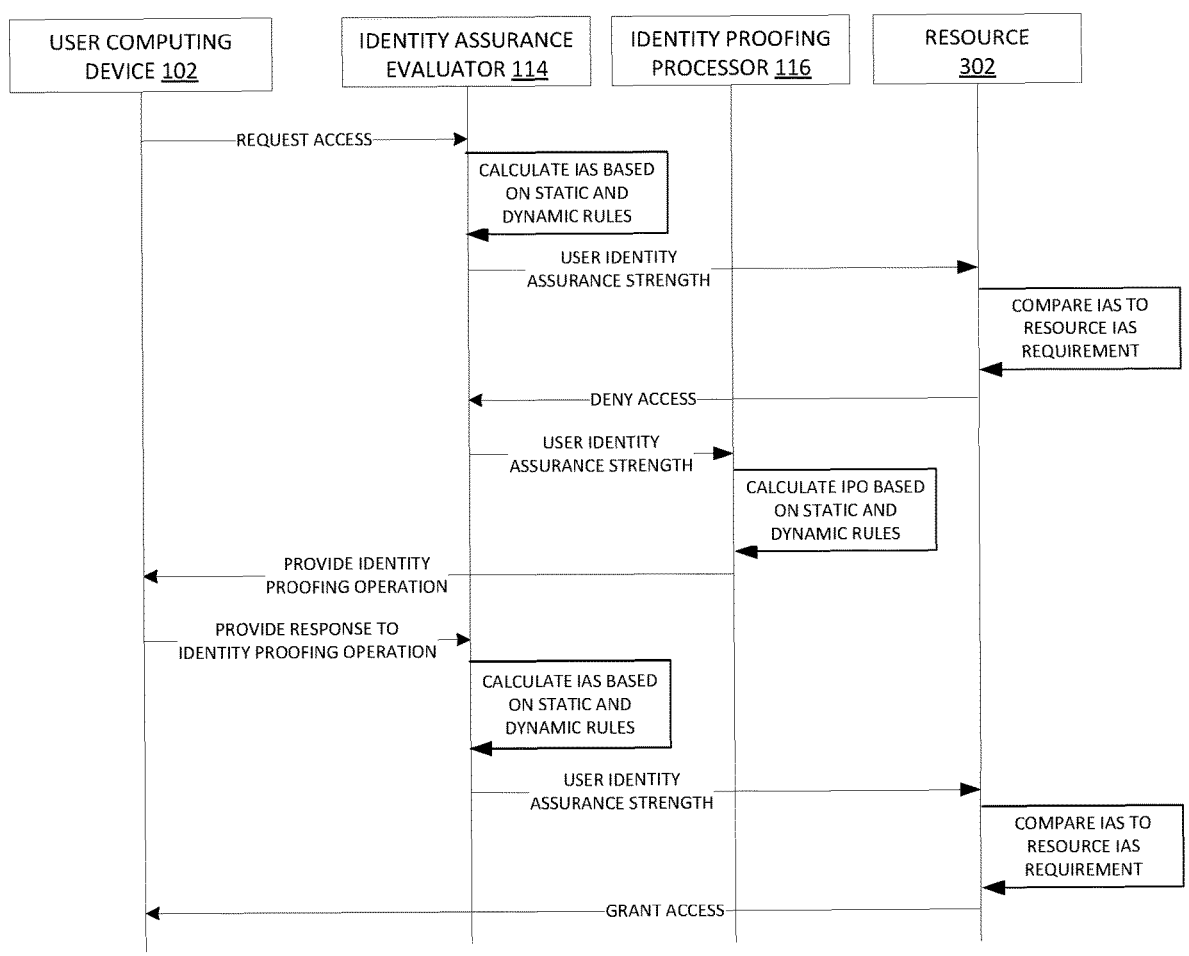
FIG. 3B depicts an example flow diagram of an implementation of granting access to a resource based on adaptively determining an identity proofing operation and the identity assurance strength of the user requesting access to a resource.

Example Flow Diagram for Adaptively Determining the Identity Proofing Operation and the Identity Assurance Strength of a User FIG. 3B depicts an example flow diagram 350 of an implementation of adaptively determining an identity proofing operation and granting access to a resource based on the identity assurance strength of the user.

In the flow diagram 350, a user via a user computing device 102 requests access to a resource 302 (i.e., internal resource 202 or external resource 204 as described in FIG. 2) from a resource provider. The resource provider can receive the request, and the identity assurance evaluator 114 (either internal or remote to the resource provider) can evaluate the request and calculate the identity assurance strength (IAS) of the user based on static and dynamic rules. The identity assurance strength of the user is compared to the identity assurance strength of the resource 302. If the identity assurance strength of the user is not sufficient in meeting the resource requirement of the identity assurance strength, then the user is denied access to the resource 302.

Upon denying access to the resource 302, the identity proofing processor 116 (either internal or remote to the resource provider) determines an identity proofing operation (IPO) based on static rules, dynamic rules, and other identity proofing operation considerations including the current identity assurance strength. Once the identity proofing operation is determined by the identity proofing processor 116, the user is provided the identity proofing operation by the resource provider. The user completes the identity proofing operation and provides a response to the resource provider. Based on the response, a new identity assurance strength of the user is determined by the identity assurance evaluator 114. The new determined identity assurance strength of the user is compared to the identity assurance strength requirement of the resource 302. If the new determined identity assurance strength of the user is sufficient in meeting the resource requirement of the identity assurance strength, then the user is granted access to the resource 302.

Example Method for Determining Valid Identity Proofing Events of the User

Figure 4:
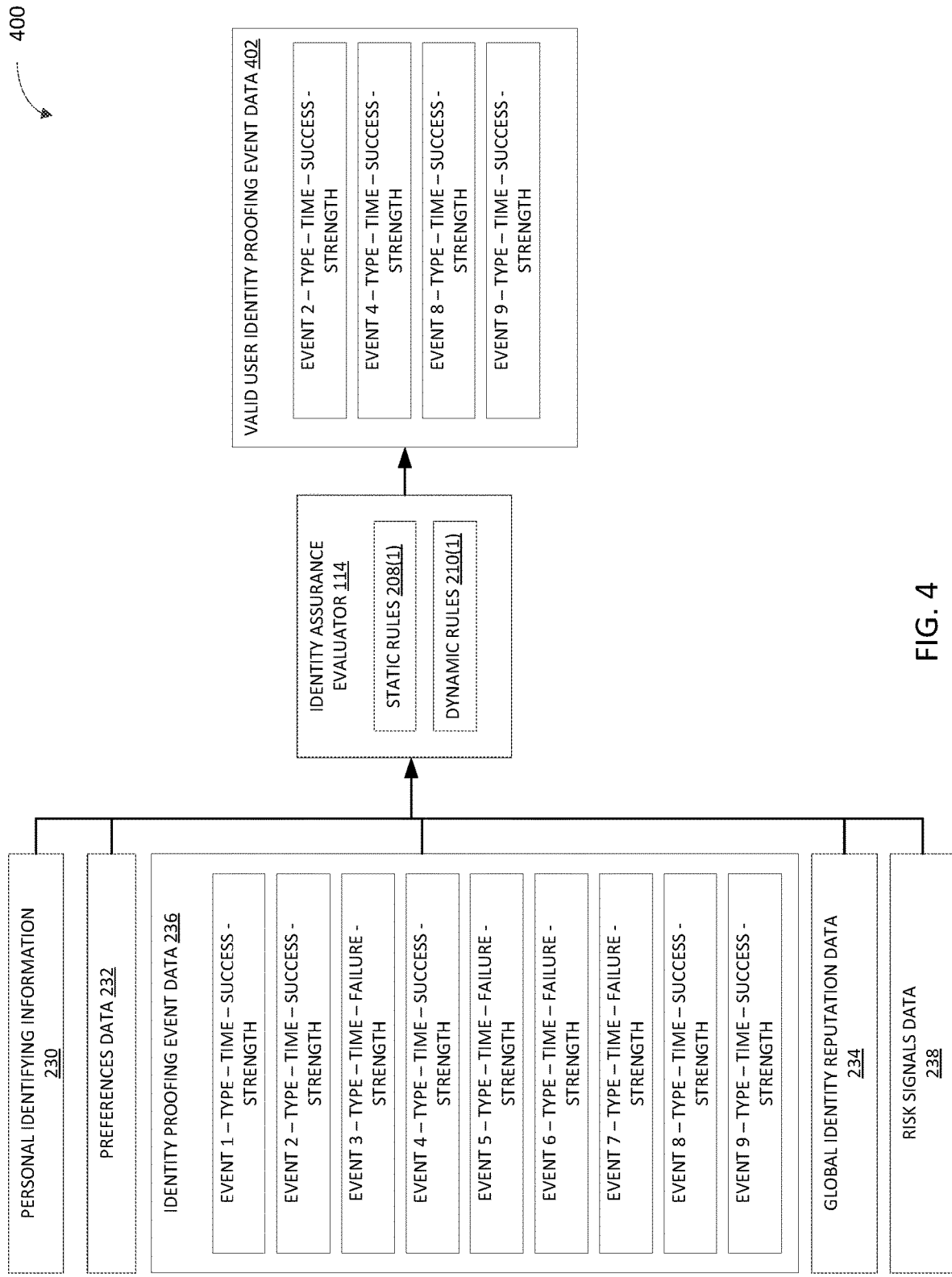
FIG. 4 depicts an example flow diagram of determining valid identity proofing events of the user for determining the identity assurance strength of a user requesting access to a resource based on identity assurance strength.

FIG. 4 depicts an example flow diagram 400 of determining valid identity proofing events of the user for determining the identity assurance strength of a user requesting access to a resource.

In the example flow diagram 400, user data including personal identifying information 230, preferences data 232, identity proofing event data 236, global identity reputation data 234, and risk signals data 238 are reviewed by the identity assurance evaluator 114. The identity assurance evaluator 114 takes the user data and determines based on static rules 208(1) and dynamic rules 210(1) valid user identity proofing event data 402 from the user data. The valid user identity proofing event data 402 based on user data is then used to determine the identity assurance strength of the user.

As depicted in FIG. 4, user data indicates user has nine associated identity proofing events. Out of the nine identity proofing events, five of the identity proofing events indicate the user successfully completed the identity proofing method, identity proofing operation, etc., and four of the identity proofing events indicate the user failed.

The identity assurance evaluator 114 determines based on the user data, static rules 208(1), and dynamic rules 210(1) which identity proofing events are valid for determining the identity assurance strength. As depicted in FIG. 4, the valid user identity proofing event data 402 includes four identity proofing events out of the five identity proofing events that indicated successful completion by the user. Event 1 is not included in the valid user identity proofing event data 402.

The identity assurance evaluator can exclude Event 1 based on static rules. For example, timeframe criteria associated with the access policy of the resource can define a static rule that requires identity proofing events beyond a certain time period be excluded from the determination of the identity assurance strength as being too far in the past. Alternatively, static rules may be defined by timeframe criteria can indicate that identity proofing events are not valid after a certain period of time such expiration of time associated with the identity proofing method (i.e., expiration of driver's license for government ID verification, expiration of phone verification code, etc.).

In another example, risks signal data 238 associated with the user can indicate there is a risk signal associated with the user. Based on the identity proofing event data 236 depicted in FIG. 4, there are three consecutive failed attempts to complete an identity proofing method. The resource provider can flag this activity as a risk signal associated with the user as risk signal data 238. Alternatively, a third party risk signal provider monitoring user activity can flag the three consecutive failed attempts as a risk signal. The risk signal data 238 can then be reviewed by the identity assurance evaluator 114 based on the static rules 208(1) and dynamic rules 210(1). Upon determining a risk signal present in the risk signal data, the identity assurance evaluator 114 can indicate based on the static rules 208(1) or dynamic rules 210(1) that one successful identity proofing event needs to be eliminated along with the failed attempts for determining valid user identity proofing event data 402. In some implementations, there can be the static rules 208(1) or dynamic rules 210(1) that require other actions include eliminating all identity proofing events of the user or blocking access of the user.

With Event 1 eliminated from consideration in FIG. 4, there are four identity proofing events included in the valid user identity proofing event data 402. Based on the associated strengths of each identity proofing event, the identity assurance strength of the user is determined.

Figure 5:
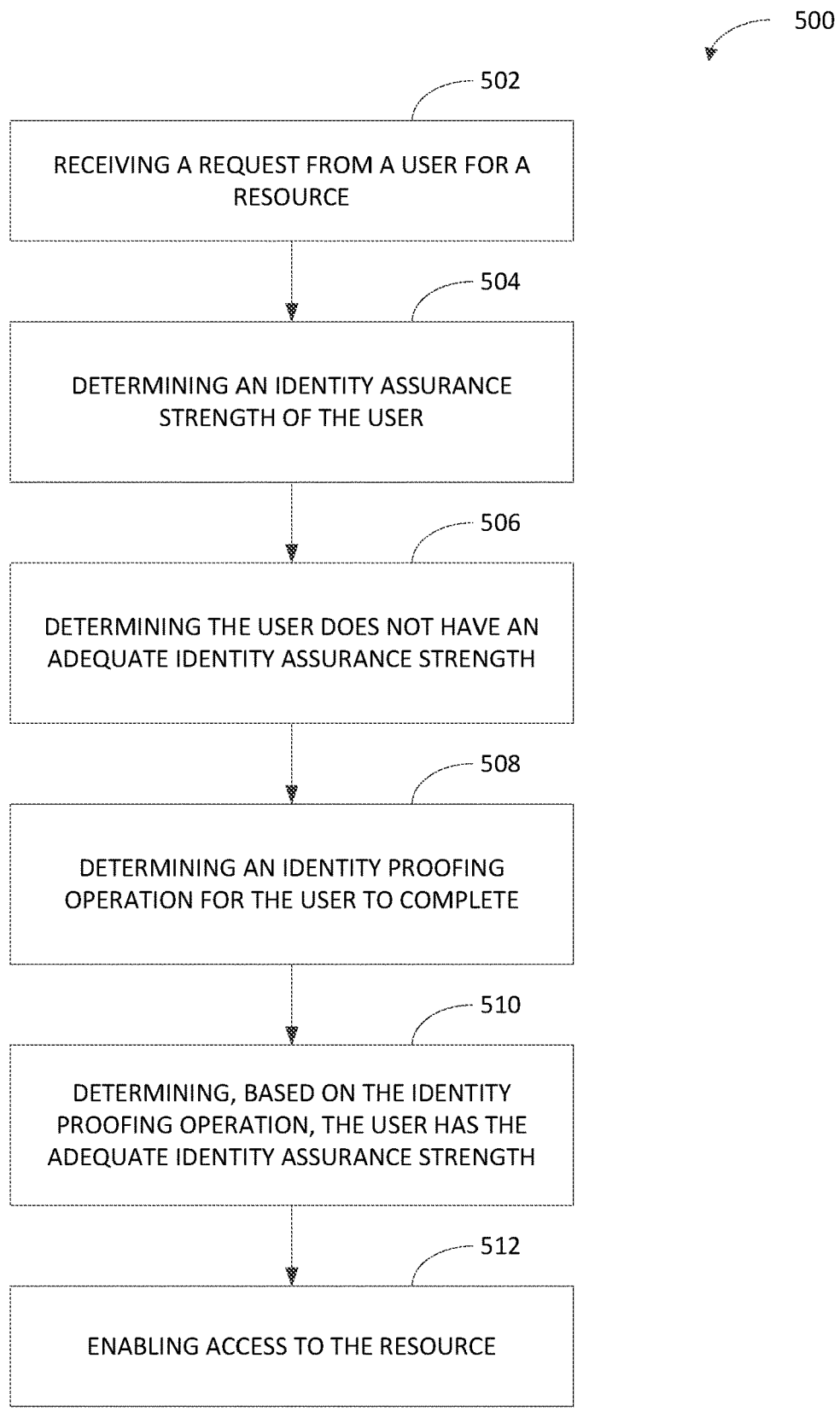
FIG. 5 depicts an example method for determining the identity assurance strength of a user requesting access to a resource.

Example Method for Adaptively Determining the Identity Assurance Strength of a User FIG. 5 depicts an example method 500 for adaptively determining an identity assurance strength of a user requesting access to a computer-based resource.

At step 502, a request is received from a user for a resource. For example, a user can request access to a computer-based resource. The computer-based resource can be associated with one or more resource providers including, for example, an employer, bank, credit card company, and the Internal Revenue Service, to name a few.

In some implementations, the request for access to the computer-based resource can be received at a resource provider over a network via a computing device associated with the user.

At step 504, an identity assurance strength of the user is determined by an identity assurance evaluator, as described for example in FIGS. 2 and 4. In order to provide access to the computer-based resource the user is requesting, a resource provider determines the user's identity and whether the user has the necessary authority to access the computer-based resource, according to the access policy associated with the computer-based resource. In order to determine the identity and necessary authority of the user, an identity assurance evaluator (either internal or external to the resource provider) determines the identity assurance strength associated with the user.

If the identity assurance strength of the user meets the identity assurance strength requirement of the resource and access is granted to the requested resource. If the identity assurance strength of the user fails to meet the identity assurance strength requirement of the resource, then the method continues at step 506.

At step 506, the user is determined to not have adequate identity assurance strength to access the requested resource. The determination the user does not have adequate identity assurance strength to access the requested resource is based on evaluating the static rules based on access policy criteria associated with the requested resource, dynamic rules, and user data by the identity assurance evaluator.

At step 508, an adaptive identity proofing operation is determined specifically for the user to complete. In some implementations, the identity proofing operation can be determined based on leveraging static rules and dynamic rules by the identity proofing processor (either internal or external to the resource provider). More specifically, the identity proofing processor can determine the identity proofing operation based on certain considerations including the policy, the current identity assurance strength of the user, capability of the computing device associated with the user, risk signals, global identity reputation, availability of an identity proofing method, user preference, user experience friction (which refers to the ease of use of an identity proofing method for a user), or other considerations for determining the identity proofing operation for the user to complete. The identity proofing operation can comprise one or more identity proofing methods adapted for the user to complete.

For example, the identity proofing processor can determine access policy criteria requiring a user requesting access to a computer-based resource to complete either a phone verification or a OOW KBA prior to granting access to the resource. The identity proofing processor can determine the user requesting access does not have an associated cell phone to complete the phone verification based on reviewing user data. The identity proofing operation can then be adapted according to the policy to require that the user complete the OOW KBA instead.

In another example, if the risk signals indicate the user is compromised, then the identity proofing methods required as part of the identity proofing operation can be adjusted according to the policy. In some implementations, the policy can require an additional identity proofing method as part of the identity proofing operation such as requiring the user to complete both phone verification and government identification verification.

In some implementations, the identity proofing processor can fail to determine an identity proofing operation for the user to complete. For example, an identity proofing method required by the access policy may not be available, or completion of the required identity proofing method may fail to increase the current identity assurance strength of the user to the necessary identity assurance strength due to global identity reputation, etc. If no identity proofing operation can be determined, then access to the resource is blocked.

At step 510, the identity assurance strength of the user, based on the identity proofing operation, is determined as adequate for accessing the requested computer-based resource. For example, the identity assurance strength of the user can be determined upon completion of the identity proofing operation. If the user does not successfully complete the identity proofing operation, then the failed attempt by the user to complete the identity proofing operation will be recorded in the history of identity proofing events associated with the user. In some implementations, the user may be blocked from accessing the computer-based resource.

At step 512, access is granted to the user for the resource. In some implementations, in addition to granting access to the user for the resource, the successful completion of the one or more identity proofing methods in the identity proofing operation is recorded as part of the history of identity proofing events associated with the user.

Figure 6A:
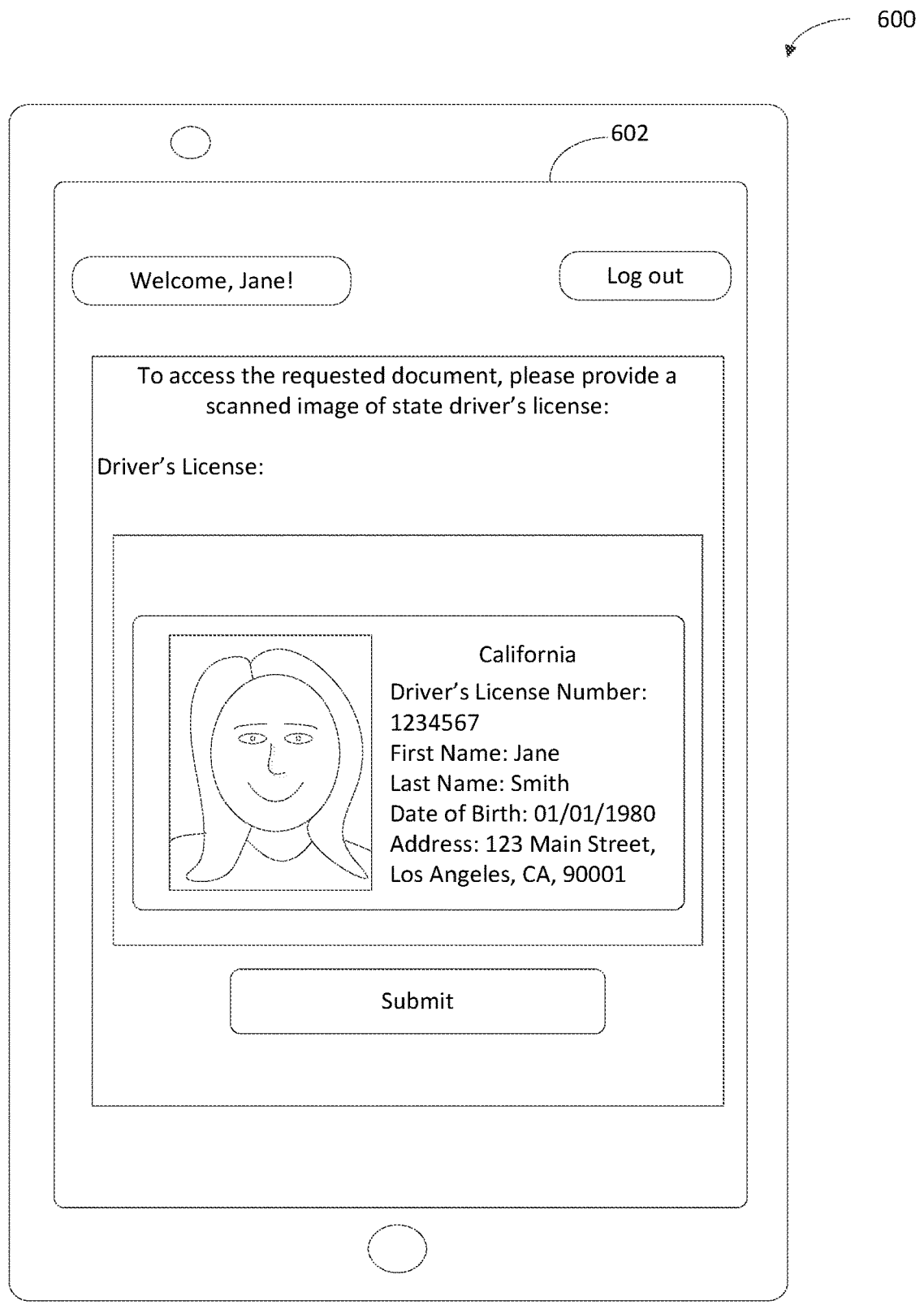
FIGS. 6A-6C depict examples of user interfaces presented to a user for adaptively determining the identity assurance strength of the user requesting access to a resource.
Figure 6B:
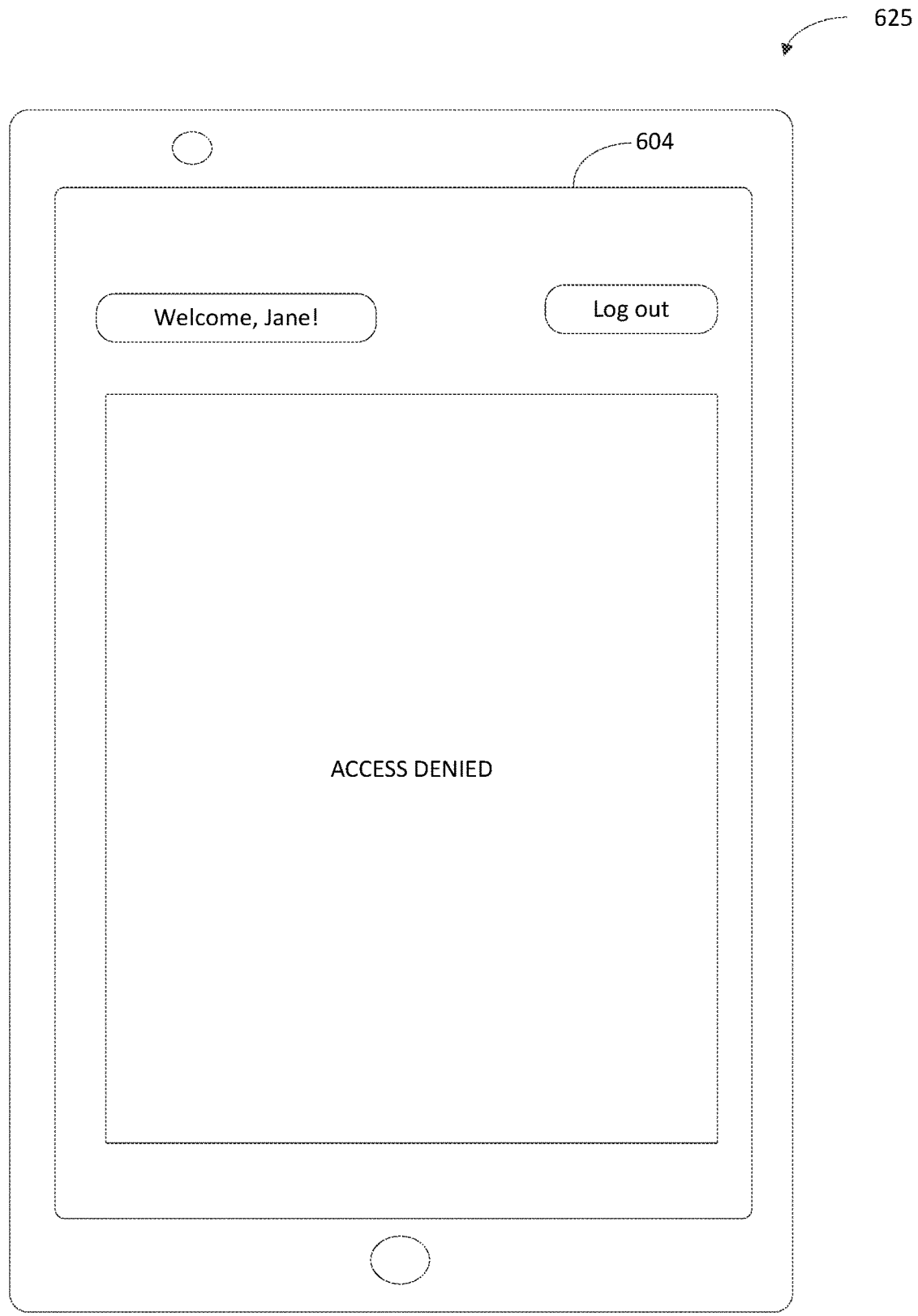
Figure 6C:
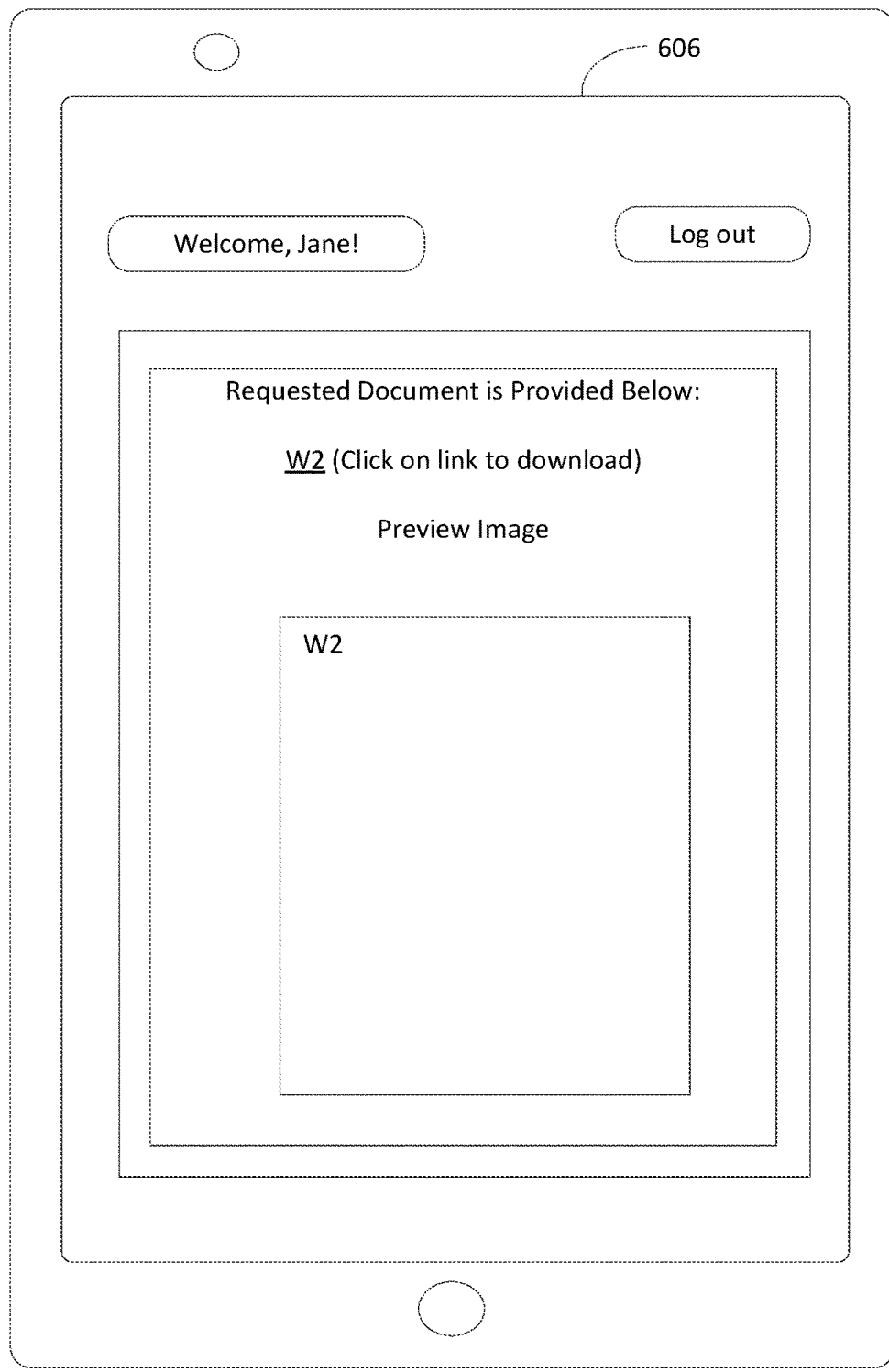

Examples of User Interfaces Presented to a User for Adaptively Determining Identity Assurance Strength FIGS. 6A-6C depict examples of user interfaces presented to a user via a computing device, such as user computing device 102 in FIG. 1, during the method of adaptively determining the identity of the user requesting access to the computer-based resource.

FIG. 6A depicts an example 600 of user interface 602 presented to a user. In some implementations, the user interface 602 is presented to a user after the user requests access to a resource provider for a computer-based resource. The resource provider can then request personal identifying information from the user. The computing device can receive the request from the resource provider and prompt the user, as depicted in user interface 602, to provide personal identifying information. For example, as depicted in FIG. 6A, the user is prompted to provide their driver's license based on a requirement from the access policy associated with the computer-based resource. The personal identifying information is then received by the resource provider to consider when determining the identity assurance strength of the user.

FIG. 6B depicts an example 625 of user interface 604 presented to a user. In some implementations, the resource provider can receive global identity reputation associated with the user requesting access. In other implementations, the resource provider can receive one or more risk signals associated with the user requesting access to the computer-based resource. Upon receipt of the global identity reputation data or risk signals, the resource provider can determine that the identity of the user seeking access to the computer-based resource is compromised. Based on the access policy, the resource provider can block access to the user requesting access, and the user computing device can present the user interface 604 to the user indicating that access to the requested resource is denied.

In other implementations, the user interface 604 is presented to a user not successfully completing the identity proofing operation.

In still other implementations, the user interface 604 is presented to the user based on the user not having an adequate identity assurance strength and no identity proofing operation can be determined, based on the access policy associated with the resource, to be sufficient to raise the identity assurance strength of the user. In such implementations, the user can be presented with user interface 604 indicating access to the computer-based resource is denied.

FIG. 6C depicts an example 650 of user interface 606 presented to a user with adequate identity assurance strength to access a computer-based resource. Upon determining the identity assurance strength of the user, if the identity assurance strength of the user is sufficient based on the access policy associated with the computer-based resource, then the user can access the resource. For example, the user can be provided a link, a download, or other methods of access in order to access the computer-based resource from a resource provider.

In some implementations, the user interface 606 is presented to a user upon determining the identity assurance strength is adequate based on the access policy of the computer-based resource and the personal identifying information provided, risk signals received, and history of identity proofing events associated with the user.

Figure 7:
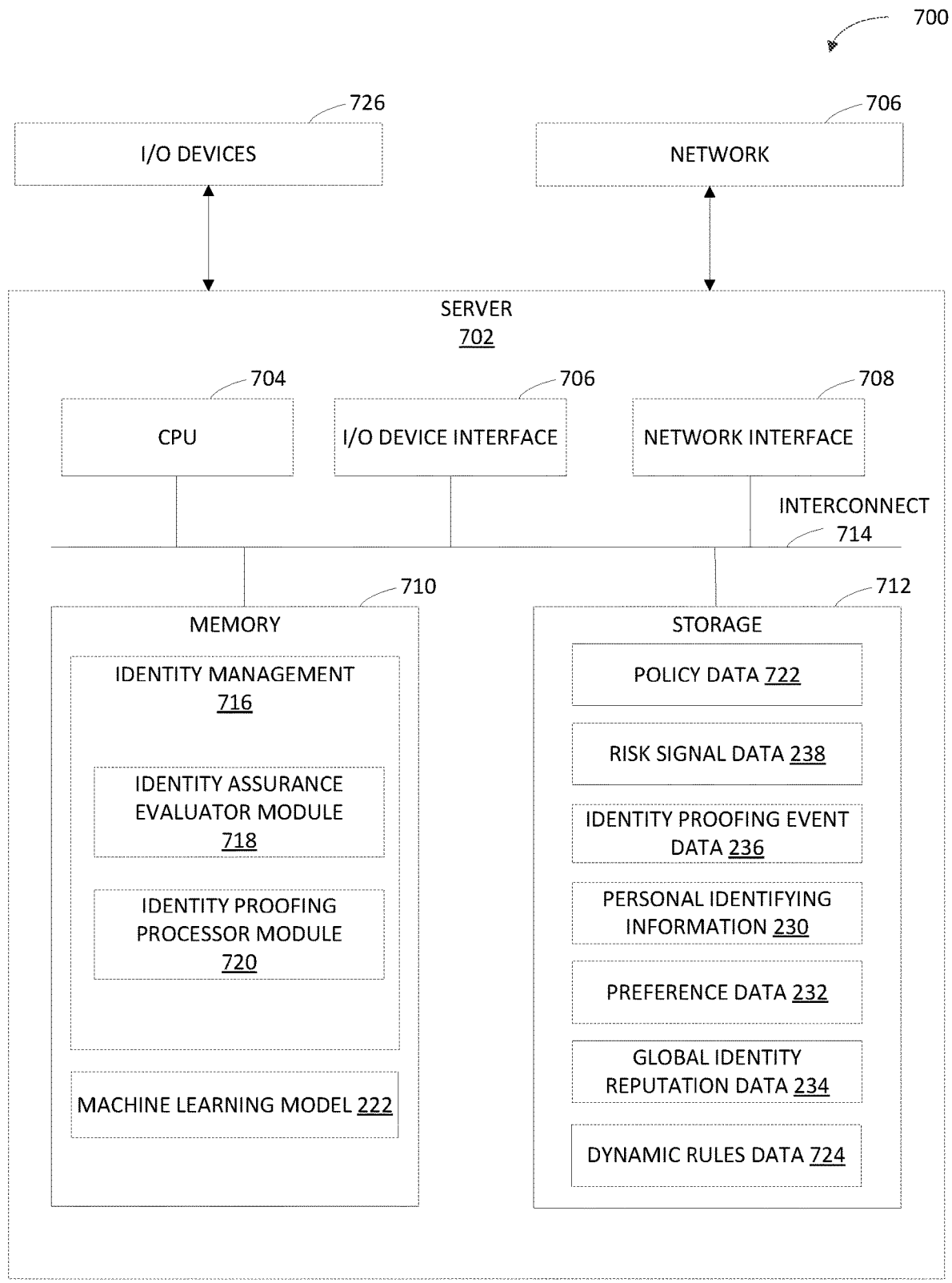
FIG. 7 depicts an example computing device for adaptively determining an identity assurance strength of a user requesting access to a resource.

Example System for Adaptively Determining the Identity Assurance Strength of a User FIG. 7 depicts an example computing system 700 of a resource provider for adaptively determining the identity of a user. For example, the computing system 700 can be representative of a server 702 associated with a resource provider 104, as depicted and described with respect to FIG. 1.

As shown, the server 702 includes a central processing unit (CPU) 704, one or more input/output (I/O) device interfaces 706 that can allow for the connection of various I/O devices 726 (e.g., keyboards, displays, mouse devices, pen input, etc.) to the server 702, network interface 708, a memory 710, a storage 712, and an interconnect 714. It is contemplated that one or more components of the computing system 700 can be located remotely and accessed via network 106. It is further contemplated that one or more components of the computing system 700 can comprise physical components or virtualized components.

CPU 704 may retrieve and execute programming instructions stored in the memory 710. The memory 710 can include an identity management 716, identity assurance evaluator module 718 and identity proofing processor module 720. For example, CPU 704 can be configured to execute instructions and perform the method described above with respect to FIG. 5. The memory 710 can also include machine learning model 222, which can dynamically build rules based on training and learning patterns of behavior from user data such as risk signal data 238, identity proofing event data 236, personal identifying information 230, preference data 232, and global identity reputation data 234. The dynamic rules can be stored as dynamic rule data 724 in storage 712.

The identity management 716 can comprise the identity assurance evaluator module 718 and identity proofing processor module 720. The identity assurance evaluator module 718 can utilize the identity assurance evaluator to determine an identity assurance strength of a user requesting access to a computer-based resource. For example, the identity assurance evaluator module 718 can determine the identity assurance strength of a user based on policy data 722 including access policy criteria based static rules, dynamic rules, personal identifying information 230, risk signal data 238, identity proofing event data 236 associated with the user, preference data 232, and global identity reputation data 234.

The identity proofing processor module 720 can leverage identity proofing processor to determine an identity proofing operation for a user to complete if it is determined the user does not have the necessary identity assurance strength to access a computer-based resource. The identity proofing processor module 720 can adaptively determine the identity proofing operation for each user based on considerations including the identity proofing method required by the policy associated with the resource, the current identity assurance strength of the user, the identity proofing method available, capabilities of the computing device associated with the user requesting access, risk signal data 238, global identity reputation data 234, preference data 232, and user experience friction. For example, the identity proofing processor module 720, utilizing identity proofing processor when considering user experience friction can determine the identity proofing methods that are easier for the user to complete, as well as consistent with other considerations such as policy and user preferences, as being part of the identity proofing operation.

The interconnect 714 transmits programming instructions, identity assurance strength data, and other data among the CPU 704, I/O device interface 706, network interface 708, memory 710, and storage 712. CPU 704 is included to be representative of a single CPU, multiple CPUs, and a single CPU having multiple processing cores. Additionally, the memory 710 is included to be representative of a random access memory. Furthermore, the storage 712 can be a disk drive, solid state drive, or a collection of storage devices distributed across multiple storage systems. Although shown as a single unit, the storage 712 can be a combination of fixed and/or removable storage devices, such as fixed disc drives, removable memory cards or optical storage, network attached storage (NAS), or a storage area-network (SAN). Storage 712 may comprise policy data 722, risk signal data 238, identity proofing event data 236, personal identifying information 230, preference data 232, global identity reputation data 234, and dynamic rules data 724.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include, but is not limited to, calculating, computing, processing, deriving, investigating, looking up (e.g., looking up in a table, a database or another data structure), and ascertaining. Also, "determining" may include, but is not limited to, receiving (e.g., receiving information), accessing (e.g., accessing data in a memory). Also, "determining" may include, but is not limited to, resolving, selecting, choosing, and establishing.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, and power management circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for identity proofing, comprising:
    receiving a request from a user for a resource of a plurality of resources;
    retrieving user data associated with the user including:
        personal identifying information,
        global identity reputation data from a first service,
        identity proofing event data, and
        risk signal data from a second service,
    retrieving access criteria for the resource of the plurality of resources;
    generating based on the user data via a machine learning model that is trained using previously collected user data a set of dynamic rules for the user;
    determining an identity assurance strength of the user based on an application of the access criteria and the set of dynamic rules to the user data that includes at least:
        determining the retrieved personal identifying information matches personal identifying information associated with each identity proofing event in the identity proofing event data, wherein the identity proofing event data includes each successful and unsuccessful attempt of the user to access any resource; and
        determining valid identity proofing events and associated strengths from the valid identity proofing events based on:
            eliminating one or more invalid identity proofing events from the identity proofing event data, the eliminating comprising:
                determining, from the identity proofing event data, an identity proofing event that exceeds a timeframe, and
                determining the user data includes the global identity reputation data and the risk signal data;
        determining the identity assurance strength based on the valid identity proofing events and corresponding strengths from the valid identity proofing events;
    determining the identity assurance strength of the user is not adequate to access the resource;
    determining an identity proofing operation for the user to complete, that is adapted to the user based on at least:
        an identity proofing method needed to satisfy the access criteria and the set of dynamic rules;
        a capability of a computing device associated with the user;
        a global identity reputation associated with the user; and
        a risk signal associated with the user;
    generating an updated identity assurance strength;
    determining that the updated identity assurance strength of the user is adequate to access the resource; and
    enabling access to the resource.

2. The method of claim 1, wherein the method further comprises:
    determining, based on the identity proofing operation, that the user does not have the adequate identity assurance strength to access the resource;
    blocking access to the resource; and
    storing the determination as a failed identity proofing event.

3. The method of claim 1, wherein the determination the user does not have an adequate identity assurance strength is based on evaluating a policy associated with the resource.

4. The method of claim 1, wherein successful completion of the identity proofing operation is recorded as part of the identity proofing event data associated with the user.

5. The method of claim 1, wherein the global identity reputation data or risk signal data are associated with at least one of:
    a user account;
    an email address;
    a telephone number;
    personal identifying information; or
    a user device.

6. The method of claim 1, wherein the determination of the identity proofing operation is further based on at least one of:
    an availability of an identity proofing method;
    a user preference; or
    a user experience friction.

7. The method of claim 1, wherein the machine learning model is trained based on previously collected data from other users.

8. A non-transitory computer readable storage medium storing instructions for performing a method for identity proofing, the method comprising:
    receiving a request from a user for a resource of a plurality of resources;
    retrieving user data associated with the user including:
        personal identifying information,
        global identity reputation data from a first service,
        identity proofing event data, and
        risk signal data from a second service,
    retrieving access criteria for the resource of the plurality of resources;

generating based on the user data via a machine learning model that is trained using previously collected user data a set of dynamic rules for the user;
determining an identity assurance strength of the user based on an application of the access criteria and the set of dynamic rules to the user data that includes at least:
  determining the retrieved personal identifying information matches personal identifying information associated with each identity proofing event in the identity proofing event data, wherein the identity proofing event data includes each successful and unsuccessful attempt of the user to access any resource; and
  determining valid identity proofing events and associated strengths from the valid identity proofing events based on
    eliminating one or more invalid identity proofing events from the identity proofing event data, the eliminating comprising:
      determining, from the identity proofing event data, an identity proofing event that exceeds a timeframe, and
      determining the user data includes the global identity reputation data and the risk signal;
    determining the identity assurance strength based on the valid identity proofing events and corresponding strengths from the valid identity proofing events;
determining the identity assurance strength of the user is not adequate to access the resource;
determining an identity proofing operation for the user to complete that is adapted to the user based on at least:
  an identity proofing method needed to satisfy the access criteria and the set of dynamic rules;
  a capability of a computing device associated with the user;
  a global identity reputation associated with the user; and
  a risk signal associated with the user;
generating an updated identity assurance strength;
determining that the updated identity assurance strength of the user is adequate to access the resource; and
enabling access to the resource.

9. The non-transitory computer readable storage medium of claim 8, wherein the method further comprises:
  determining, based on the identity proofing operation, the user does not have the adequate identity assurance strength to access the resource;
  blocking access to the resource; and
  storing the determination as a failed identity proofing event.

10. The non-transitory computer readable storage medium of claim 8, wherein the determination the user does not have an adequate identity assurance strength is based on evaluating a policy associated with the resource.

11. The non-transitory computer readable storage medium of claim 8, wherein successful completion of the identity proofing operation is recorded as part of the identity proofing event data associated with the user.

12. The non-transitory computer readable storage medium of claim 8, wherein the global identity reputation data or risk signal data are associated with at least one of:
  a user account;
  an email address;
  a telephone number;
  personal identifying information; or
  a user device.

13. The non-transitory computer readable storage medium of claim 8, wherein the determination of the identity proofing operation is further based on at least one of:
  an availability of an identity proofing method;
  a user preference; or
  a user experience friction.

14. The non-transitory computer readable storage medium of claim 8, wherein the machine learning model is trained based on previously collected data from other users.

15. The system of claim 8, wherein the machine learning model is trained based on previously collected data from other users.

16. A system, comprising:
a processor; and
a memory storing instructions which when executed by the processor perform a method for identity proofing, the method comprising:
  receiving a request from a user for a resource of a plurality of resources;
  retrieving user data associated with the user including:
    personal identifying information,
    global identity reputation data from a first service,
    identity proofing event data, and
    risk signal data from a second service,
  retrieving access criteria for the resource of the plurality of resources;
  generating based on the user data via a machine learning model that is trained using previously collected user data a set of dynamic rules for the user;
  determining an identity assurance strength of the user based on an application of the access criteria and the set of dynamic rules to the user data that includes at least:
    determining the retrieved personal identifying information matches personal identifying information associated with each identity proofing event in the identity proofing event data, wherein the identity proofing event data includes each successful and unsuccessful attempt of the user to access any resource; and
    determining valid identity proofing events and associated strengths from the valid identity proofing events based on:
      eliminating one or more invalid identity proofing events from the identity proofing event data, the eliminating comprising:
        determining, from the identity proofing event data, an identity proofing event that exceeds a timeframe, and
        determining the user data includes the global identity reputation data the risk signal data;
      determining the identity assurance strength based on the valid identity proofing events and corresponding strengths from the valid identity proofing events;
  determining the identity assurance strength of the user is not adequate to access the resource;
  determining an identity proofing operation for the user to complete that is adapted to the user based on at least:
    an identity proofing method needed to satisfy the access criteria and the set of dynamic rules;
    a capability of a computing device associated with the user;
    a global identity reputation associated with the user; and
    a risk signal associated with the user;

generating an updated identity assurance strength;

determining that the updated identity assurance strength of the user is adequate to access the resource; and enabling access to the resource.

17. The system of claim 16, wherein the method further comprises:

determining, based on the identity proofing operation, the user does not have the adequate identity assurance strength to access the resource;

blocking access to the resource; and storing the determination as a failed identity proofing event.

18. The system of claim 16, wherein the determination the user does not have an adequate identity assurance strength is based on evaluating a policy associated with the resource.

19. The system of claim 16, wherein successful completion of the identity proofing operation is recorded as part of the identity proofing event data associated with the user.

20. The system of claim 16, wherein the determination of the identity proofing operation is further based on at least one of:

an availability of an identity proofing method;

a user preference; or a user experience friction.

\* \* \* \* \*